United States Patent [19]

Suzuki

[11] Patent Number: 5,207,516
[45] Date of Patent: May 4, 1993

[54] THERMAL PRINTER THAT ADJUSTS PAPER FEED TO MATCH PRINT PITCH

[75] Inventor: Michio Suzuki, Shizuoka, Japan

[73] Assignee: Tokyo Electric Co., Ltd., Tokyo, Japan

[21] Appl. No.: 595,266

[22] Filed: Oct. 9, 1990

[30] Foreign Application Priority Data

Oct. 13, 1989 [JP] Japan .................. 1-265238

[51] Int. Cl.$^5$ ............................. B41J 2/345
[52] U.S. Cl. .................... 400/120; 400/555
[58] Field of Search ............ 400/17, 65, 555, 568, 400/103, 109, 120; 101/288

[56] References Cited

U.S. PATENT DOCUMENTS 5,024,544 6/1991 Taketani ............................ 400/175
5,061,946 10/1991 Helmbold .......................... 101/288

FOREIGN PATENT DOCUMENTS

63-45072 2/1988 Japan .................... 400/103

Primary Examiner—David A. Wiecking
Assistant Examiner—Steven S. Kelley
Attorney, Agent, or Firm—Frishauf, Holtz, Goodman & Woodward

[57] ABSTRACT

A thermal printer has a memory for storing printing patterns; a printer unit on which a thermal printing head having one line of dot print elements is replaceably mounted, the printer unit driving the printing head to print a printing pattern stored in the memory in a unit of one line; and a paper feed unit for feeding paper in a direction perpendicular to a direction of a print element line of the printing head. A first timer is provided for setting a print cycle for the printing head; and a second timer is provided for setting a feed cycle for feeding paper to the printing head at a selected speed. A controller concurrently drives the printer unit in the print cycle and the paper feed unit in the feed cycle, the controller driving the printer unit to cause the printing head to print in a print cycle while the paper feed unit is driven to continuously feed paper to the printer unit at the selected speed determined by the feed cycle set by the second timer. The controller adjusts at least one of the first and second timers to thereby adjust at least one of the print cycle and feed cycle, in such a manner that the length of the paper feed per printing line is equal to a print element pitch of the printing head.

4 Claims, 7 Drawing Sheets

THERMAL PRINTER THAT ADJUSTS PAPER FEED TO MATCH PRINT PITCH

BACKGROUND OF THE INVENTION

1. Field of the Invention

This invention relates to a thermal printer which effects printing by using a thermal head comprised of a line of print elements, and more particularly, to a thermal printer for issuing labels including bar codes.

2. Description of the Related Art

In recent years, many retail shops use labels which are affixed on articles such as foodstuffs and other daily sundries and which are indicative of information pertaining to articles, to simplify sales transactions. A typical label indicates the name and price of an article in characters and its code in a bar code. In a sales transaction, a key input operation to a cash register may be omitted by utilizing a bar code scanner. By causing labels affixed on articles to be sold to one customer to be successively faced to the bar code scanner by the cash register operator, the bar code scanner reads bar codes from the labels and inputs the article codes represented by the bar codes into the cash register. The cash register registers articles specified by the article codes fed by the bar code scanner and figures out the sum total of the registered articles.

Figure 1A:
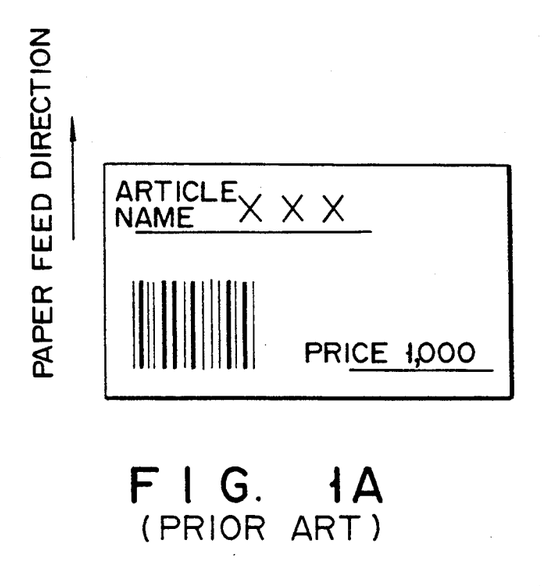
FIGS. 1A and 1B are views to illustrate examples of labels in which element bars of a bar code are respectively set in parallel and in perpendicular to the direction of a paper feed.
Figure 1B:
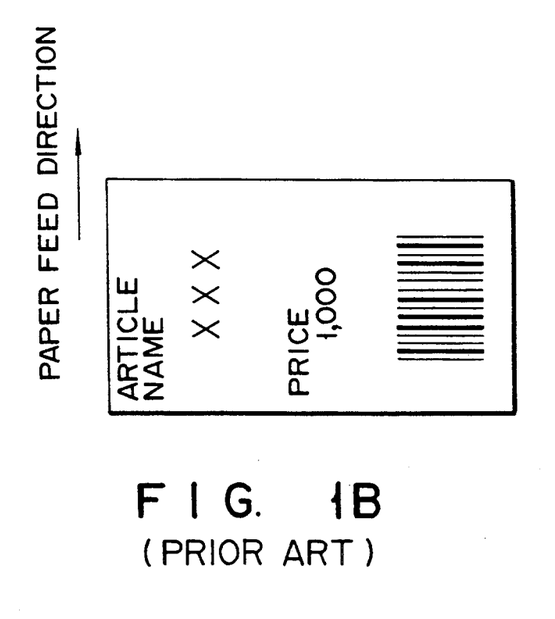

A thermal printer which has been in use for issuing labels of the type mentioned includes a thermal printing head comprising of one line of dot-print elements and issues a label by printing, as shown in FIGS. 1A or 1B, characters and a bar code on a label sheet which is fed in a direction tangent to the direction of the print-elements line. As is well known, a bar code is made up of a combination of element bars, i.e., thin bars and thick bars and must be printed out in a manner meeting the standards on the bar code, which regulate as minimum requirements the length of an element bar, a minimum permissible value of the width of the element bar, and a ratio between the widths of the thick and thin bars.

Where a bar code is printed as shown in FIG. 1A, the widths of the element bars are dependent on the dot-print density of the printing head, i.e., the pitch of the print elements. For this reason, the print elements of the printing head need to be arrayed with a pitch that satisfies the requirements of the standards applicable to the type of bar codes to be printed. Assuming that an appropriate printing head is selected, printing in the format shown in FIG. 1B must be considered. In the FIG. 1B situation, the widths of the element bars are dependent upon the length of a label sheet that is moved forward during a sequence of printing head drive cycles, in other words, a rate of feed of the sheet. The above standards must be satisfied by the same conditions as in the case of FIG. 1A, so that the paper feed mechanism is designed to feed the sheet by the length equal to the pitch of the print elements of the printing head selected each time the printing head is driven.

A variety of bar codes are used worldwide today, examples of which include JAN, UPC, CODE39 and NW7. The bar code standards applicable to these bar codes have much to differ notably in the minimum permissible value of the width of the element bars and a ratio between the widths of the thick and thin bars. Where the type of bar code used is desired to be changed in the thermal printer described above, it has been necessary to replace the printing head and in addition, to re-design the paper feed unit. In particular, designing of the paper feed unit is not an easy task and this has resulted in an increase of cost in the manufacture of thermal printers.

SUMMARY OF THE INVENTION

An object of this invention is to provide a thermal printer wherein the type of a bar code to be printed may be readily changed, and element bars may be set in a direction parallel or perpendicular to the direction of paper feed, regardless of whether replacement of the printing head has taken place.

This object may be achieved by the provision of a thermal printer which comprises a memory for storing printing patterns, a printer unit on which a thermal printing head including one line of dot-print elements is replaceably mounted and which drives the print head to print, in a unit of one line, a printing pattern stored in the memory, a paper feeding unit for feeding label paper in a direction perpendicular to a direction of a line of the print elements of the printing head mounted on the printer unit, a first timer for setting a printing cycle of the printing head, a second timer for setting a paper feeding cycle, and an adjusting circuit for adjusting at least one of the first and second timers according to the pitch of the print elements of the printing head, thereby equalizing a length of the paper feed per printing line to the pitch of the print elements of the printing head.

In the above thermal printer, at least one of the first and second timers is adjusted in accordance with the pitch of the print elements of the printing head mounted on the printer unit, whereby the length of the paper feed per printing line is equalized to such pitch. This arrangement makes it possible to load that printing pattern into the memory merely by changing the printing head, which represents a different type of bar code and sets the related element bars in parallel or perpendicular to the direction of paper feed. It is to be particularly noted that the arrangement only requires the printing head to be replaced, without the need of re-designing the paper feeding unit, and thus an increase in the manufacturing cost incidental to the change of the type of bar codes to be printed can be suppressed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

A thermal printer according to the first embodiment of the invention will be described with reference to FIGS. 2 to 4.

Figure 2:
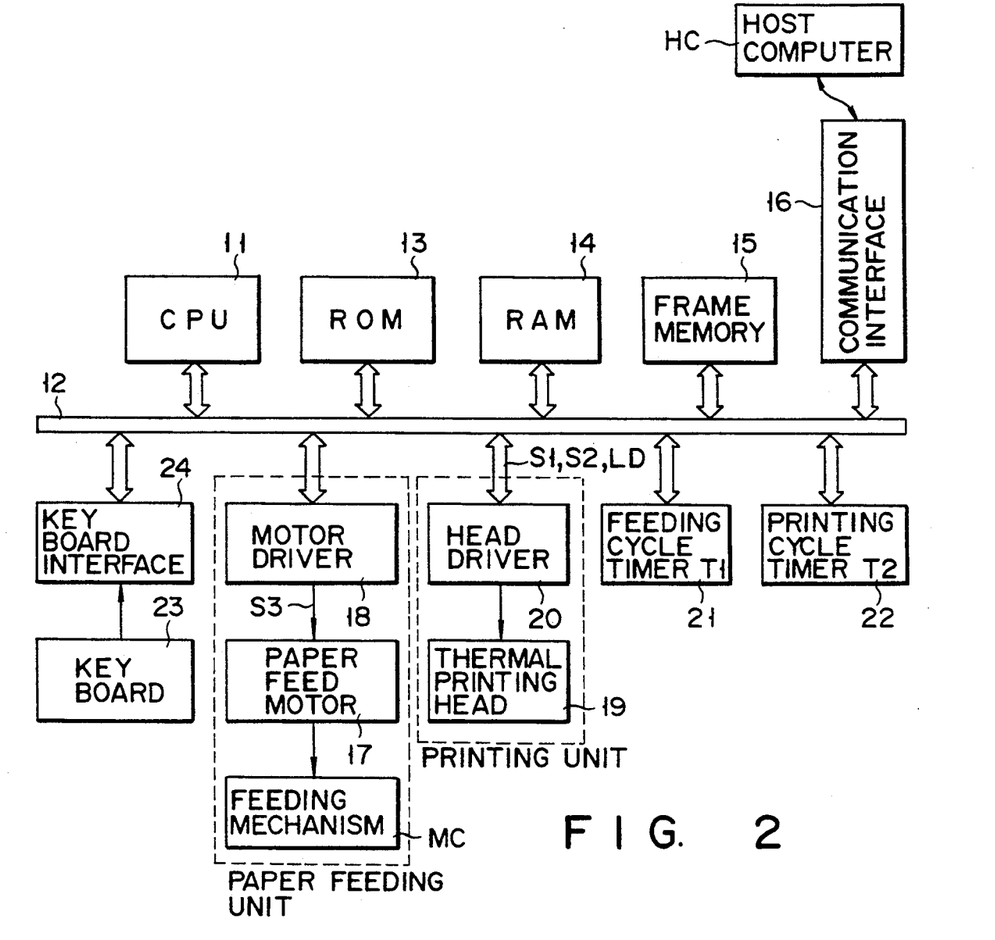
FIG. 2 is a view showing a circuit of a thermal printer embodying this invention.

FIG. 2 shows a circuit of the thermal printer. The thermal printer is designed as a label issuing device which issues labels as shown in FIGS. 1A and 1B. The thermal printer comprises a CPU 11, a bus line 12, a ROM 13, a RAM 14, a frame memory 15, a communication interface 16, a paper feed motor 17, a thermal printing head 19, a head driver 20, a paper feeding cycle timer 21, a printing cycle timer 22, a keyboard 23, and a keyboard controller 24. The CPU 11 is connected via the bus line 12 to the ROM 13, the RAM 14, the frame memory 15, the communication interface 16, the head driver 20, the paper feeding cycle timer 21, the printing cycle timer 22 and the keyboard interface 24. A motor driver 18 is connected to the paper feed motor 17; the head driver 20 is connected to the thermal printing head 19; the keyboard interface 24 is connected to the keyboard 23; and the communication interface 16 is connected to an external host computer HC. The paper feed motor 17 is mechanically coupled to a paper feed mechanism MC.

The host computer HC is used to send to the thermal printer control data including printing format data and print data to be printed on a label in the form of characters and a bar code. The CPU 11 is used to process and control various data necessary for printing a label. The ROM 13 stores a control program for CPU 11 and fixed data. The ROM 13 includes region which stores patterns for various characters including alpha-numerics and bar codes and serves as a pattern generator for generating a pattern corresponding to the print data. The RAM 14 is used to temporarily store variable data input to and output from the CPU 11 and includes a reception buffer region for storing control data received by the communication interface 16 and a work memory region which implements various counters and flag registers. The frame memory 15 has a region which stores at least one printing pattern for a label. A printing pattern is obtained by reading the print data for one label from the reception buffer region of the RAM 14, converting the data into characters and a bar code pattern by using the pattern generator, and loading the bar code pattern into the frame memory 15, and is fed to the head driver 20 in the unit of one line. The orientation of the bar code and the character pattern is designated by the printing format. The timer 21 is used to set the cycle T1 of the paper feed, and the timer 22 is used to set a print cycle T2. The paper feed motor 17 is constituted by a stepping motor and the motor driver 18 drives the paper feed motor 17 in the cycle T1 set by the feeding cycle timer 21. When driven, the stepping motor 17 is phase controlled to rotate one step angle in a predetermined direction and redriven in each target phase before it completely stops rotating. For this reason, the stepping motor 17 continues to rotate approximately at a constant speed which corresponds to the drive cycle, till label printing is complete. The head driver 20 latches a print pattern fed from the frame memory 15 in the unit of one line and sends it to the printing head 19, and also drives the printing head 19 in the cycle T2 set by the printing cycle timer 22. The keyboard 23 includes a print start key, a paper feed key and function keys for inputting the cycles T1 and T2 that are preset in the timers 21 and 22. The keyboard interface 24 is used to input a key signal generated by operating the keyboard 23 to the CPU 11.

Figure 3:
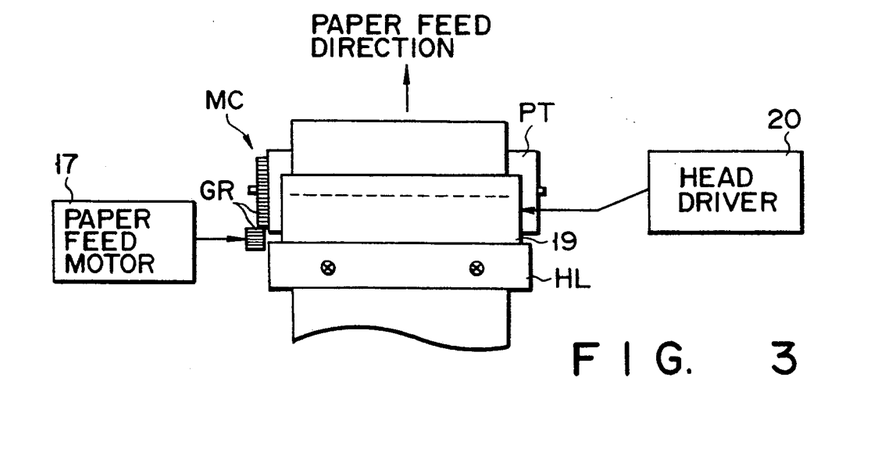
FIG. 3 is a schematic view of the thermal printing head and paper feeding mechanism shown in FIG. 2.

FIG. 3 shows the printing head 19 and a paper feeding mechanism MC including, for example, a plurality of gears GR and a platen PT coupled to the paper feed motor 17 via the gears GR. The printing head 19 has an array of dot print elements placed in a predetermined pitch according to the type of bar code to be printed and is screwed to a head holder in such a manner that the print element line is in parallel to the rotational axis of the platen PT. Label paper is inserted between the platen PT and the printing head 19 and fed in the paper feed direction indicated by the arrow in FIG. 3 as the platen PT rotates. While printing for one label is being performed, the head holder HL urges the printing head 19 against the platen PT to maintain the print element line in engagement with the label paper. With such arrangement, the feed cycle T1 and the print cycle T2 are determined to correspond the pitch of the print elements so that the length of the paper feed for one line is equal to the pitch of the print elements of the printing head 19.

Where the type of a bar code to be printed is to be changed, the printing head 19 is replaced with a separate head having print elements of a desired pitch.

The operation of the thermal printer will now be described with reference to FIG. 4.

Figure 4:
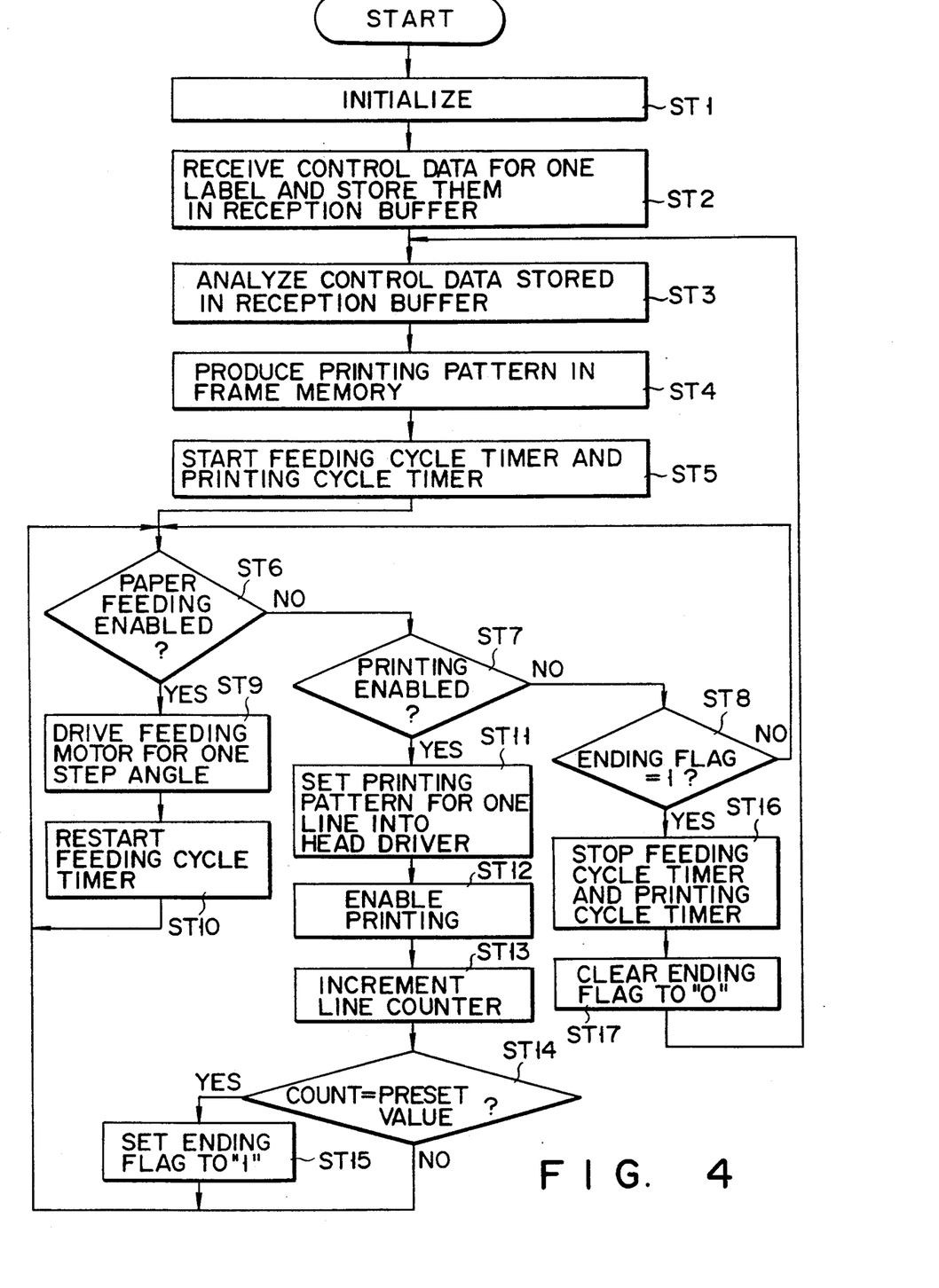
FIG. 4 is a flowchart for explaining the operation of the thermal printer shown in FIG. 2.

The CPU 11 executes the control program stored in the ROM 13 and performs processing shown in FIG. 4. Upon start of processing, initialization is conducted to initialize in step ST1 the RAM 14, the frame memory 15, the communication interface 16, the head driver 20, the motor driver 18, the feeding cycle timer 21 and the printing cycle timer 22. In the initialization processing, cycles T1 and T2 that are determined in correspondence with the print element pitch of the printing head 19 are respectively preset in the feeding cycle timer 21 and the printing cycle timer 22. For example, when the printing head was replaced, function keys of the keyboard are operated during this processing to change the cycles T1 and T2 preset in the timers 21 and 22. In step ST2, control data for one label is received via the communication interface 16 and successively stored in the reception buffer of RAM 14. The control data is analyzed in step ST3 and a printing pattern is produced in the frame memory 15 in step ST4. The feeding cycle timer 21 and the printing cycle timer 22 are started to operate in step ST5. Thereafter, steps ST6, ST7 and ST8 are repeatedly performed. More specifically, step ST6 is performed to check whether or not the timer 21 has detected the passage of the cycle T1 and permitted a paper feed. Step ST 7 is performed to check whether the timer 22 has detected the passage of the cycle T2 and permitted printing to take place. Step ST8 is performed to see if an ending flag indicates the completion of printing of one label.

When permission of paper feed is detected in step ST6, a motor drive enable signal is fed to the motor driver 18 in step ST9. Responsive to this enable signal the motor driver 18 sends a motor drive signal S3 to the stepping motor 17. The stepping motor 17 is controlled by the drive signal S3 to rotate one step angle in a fixed direction. Subsequently, when the feed cycle timer 21 is restarted in step ST10, step ST6 is performed to check whether the timer 21 has detected the passage of the cycle T1 and permitted the paper feed.

If permission to print is detected in step ST7, a printing pattern for one line is read from the frame memory 15 and fed to the head driver 20 in step ST11. Further, a latch enable signal S2 is sent to the head driver 20 with a fixed delay. In response to the latch enable signal S2, the head driver 20 latches the printing pattern for one line and drives the printing head 19 depending on the latch pattern, responsive to the print enable signal S1 fed in step ST12. A print line counter is incremented by one in step ST13, and whether or not the counter value has reached a fixed value equal to the number of lines corresponding to the size of the printing pattern is checked in step ST14. If printing of the last line is yet finished, step ST6 is again performed. On the other hand, if printing of the last line is complete, step ST15 is performed to set the end flag to "1", followed again by step ST6.

If the completion of printing for one label is confirmed from the ending flag in step ST18, the timers 21 and 22 are stopped in step ST16 and the ending flag is cleared to have a value "0" in step ST17 to permit step ST2 to be performed for issuing of a next label. If step ST8 confirms incompletion of printing of one label, step ST6 is again performed.

Figure 5A:
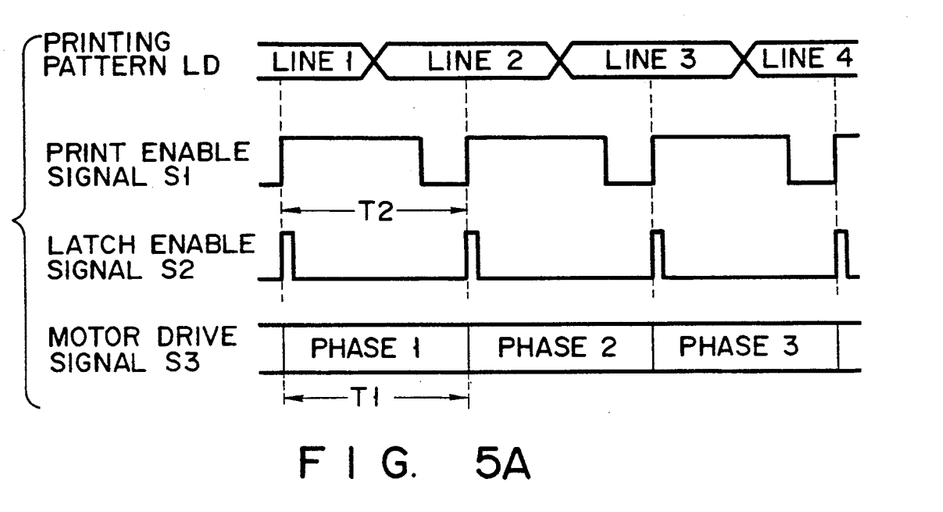
FIGS. 5A and 5B are timing charts showing the change in the printing cycle due to replacement of the printing head.
Figure 5B:
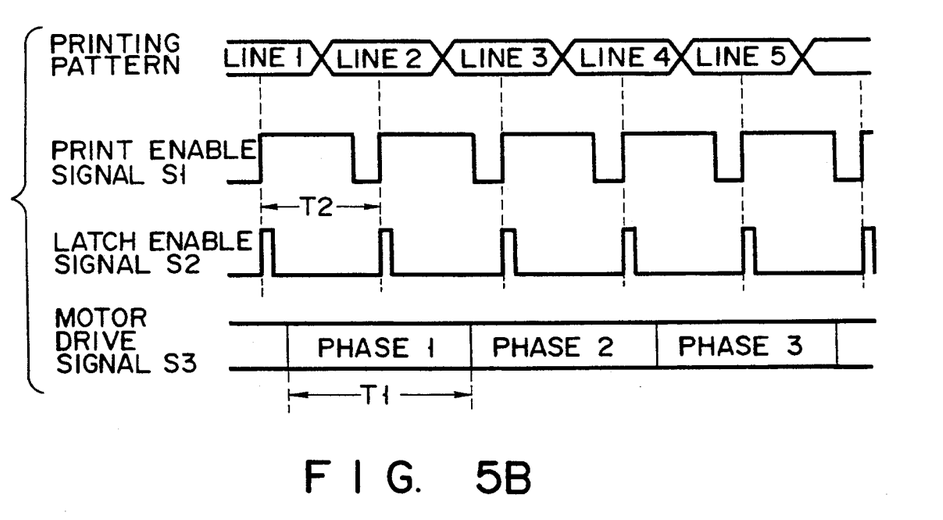

In the above described thermal printer, the cycles T1 and T2 are determined in correspondence with the print element pitch of the printing head 19 mounted on the holder HL of the printing unit and preset in the feeding cycle timer 21 and the printing cycle timer 22. When a printing head of a type that is normally used is mounted, a length required for a paper feed for one line is set to be equal to the print element pitch of the printing head 19 by printing and paper feed performed in such timings as are shown in FIG. 5A. In this case, the bar code may be printed in the same shape regardless of whether the element bars are arrayed in parallel or in perpendicular to the direction of the paper feed. In other words, the shape of the bar code may be made non-dependent on the direction of the line of the element bars.

When the printing head 19 is replaced, at least one of the cycles T1 and T2 is to be changed. If the replaced printing head 19 has a print element pitch two thirds of an ordinary pitch and if the cycle T2 only is changed, the cycle T2 is changed as shown in FIG. 5A to two thirds of an ordinary cycle in correspondence with the print element pitch, whereby a paper feed length for one line is set to be equal to the print element pitch of the printing head 19. Namely, if the printing head 19 is replaced according to the type of bar code desired, the printer easily provides for implementation to such replacement. Further, equivalent results may be obtained by setting the cycle T1 to two thirds of an ordinary value instead of changing the cycle T2.

As has been described above, the embodiment of the invention provides an arrangement wherein the paper feed cycle is not synchronous to the print cycle and either one of the cycles is changeable, with the result that to cope with replacement of the thermal printing head 19 of a differing printing density, only the paper feed cycle T1 and the print cycle T2 need to be changed to a bar code rotated 90 degrees may be printed out in the same shape as a non-rotated bar code.

Figure 6:
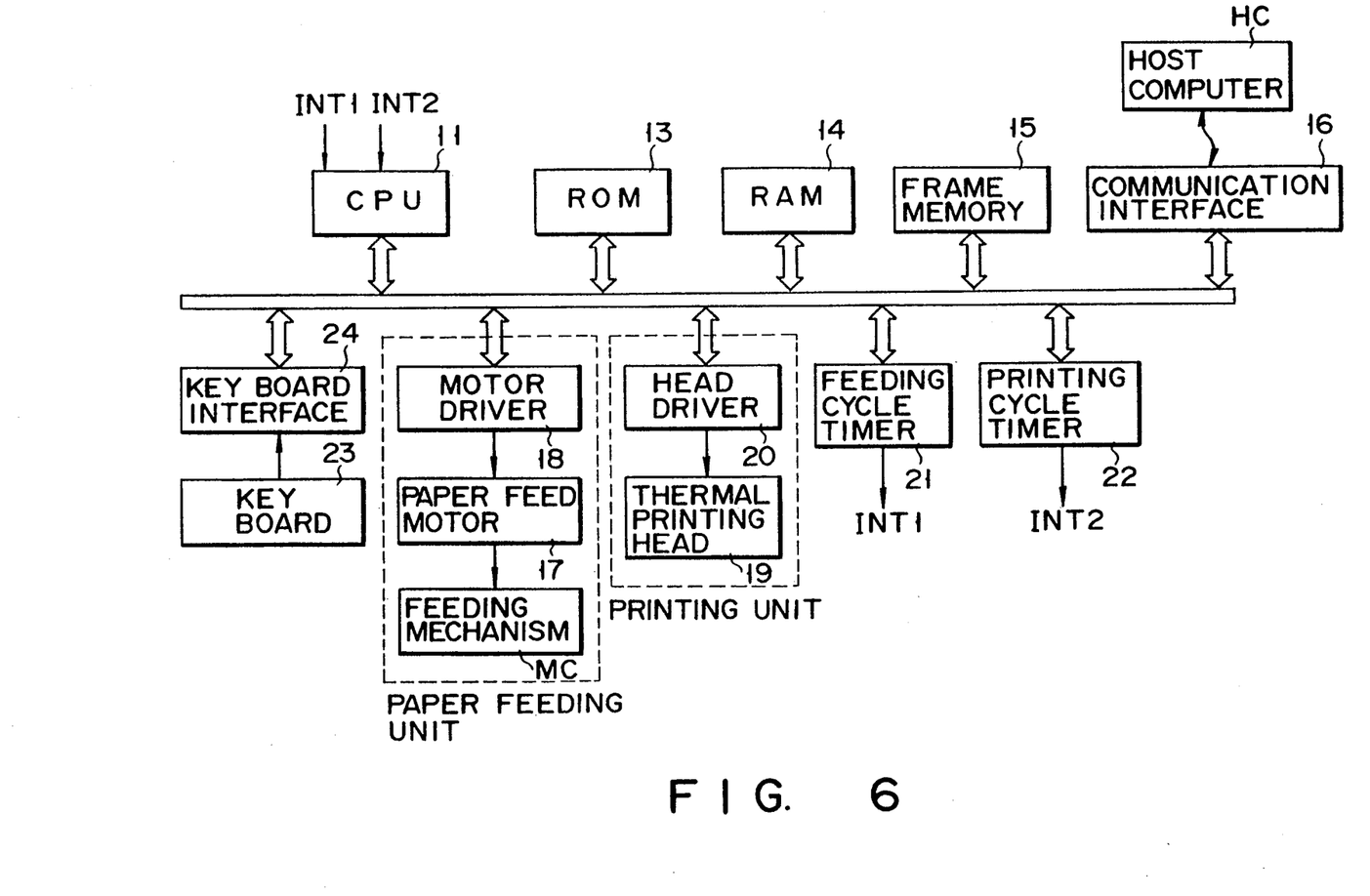
FIG. 6 is a circuit of a thermal printer according to a further embodiment of the invention.
Figure 7A:
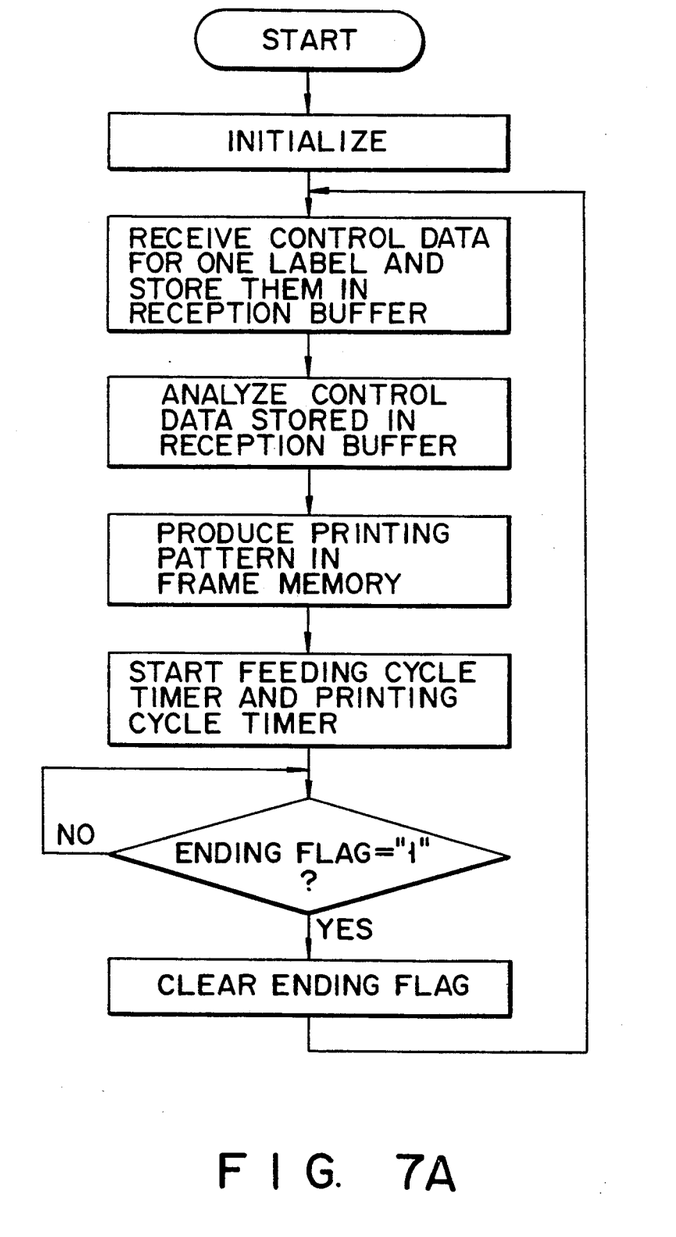
FIGS. 7A to 7C are flowcharts to explain the operation of the thermal printer shown in FIG. 6.
Figures 7B, 7C:
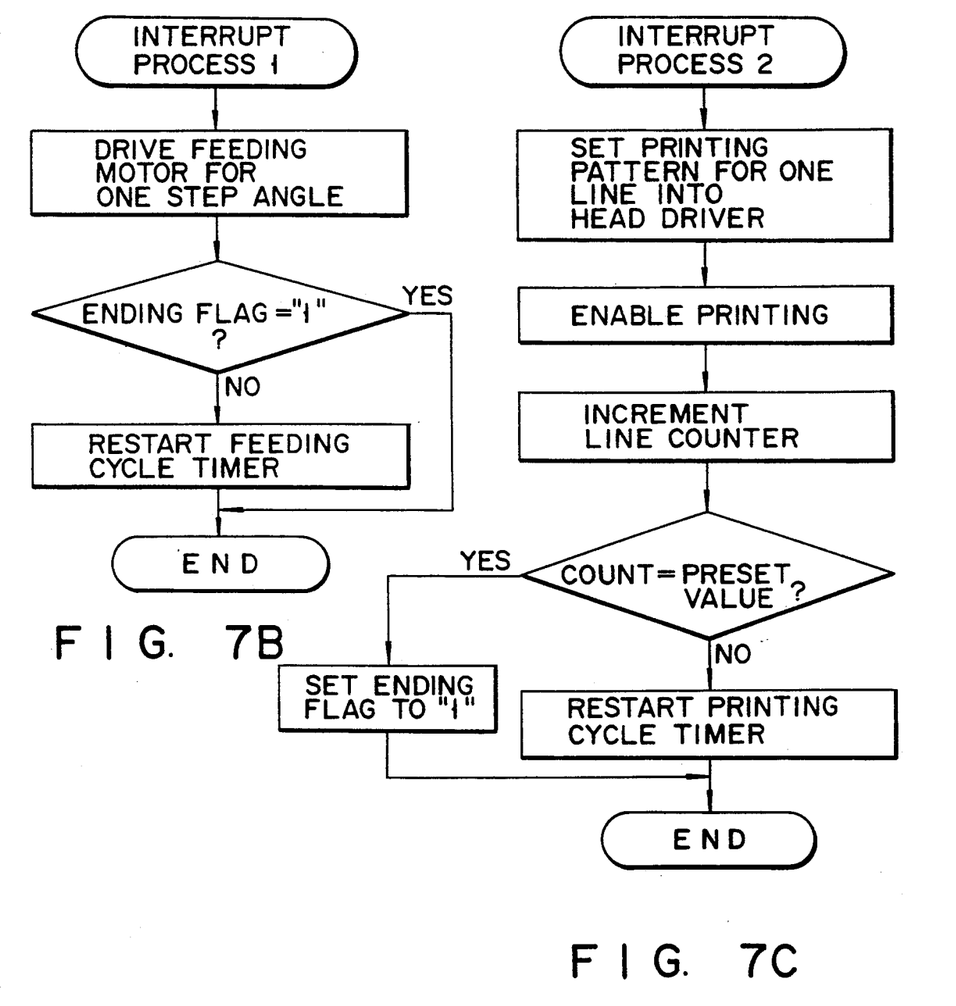

In the foregoing embodiment, while the feeding cycle timer 21 and the printing cycle timer 22 has been described to be connected to the CPU 11 only through the bus line 12, they may be directly interconnected to the CPU 11 for feeding interrupt signals INT1 and INT2 as shown in FIG. 6. In this case, the timers 21 and 22 are started upon being preset with the cycles T1 and T2 by the CPU 11 via the bus line 12 and stopped by supplying the interrupt signals INT1 and INT2 respectively to the CPU 11 after a lapse of time equal to the cycles T1 and T2. The use of timers 21 and 22 of this nature calls for slightly changing the control program to perform an operation shown in FIGS. 7A to 7C. The CPU 11 in other words normally executes the processing of FIG. 7A. Further, the CPU 11 executes interrupt processing 1 shown in FIG. 7B responsive to the interrupt signal INT1 and interrupt processing 2 shown in FIG. 7C responsive to the interrupt signal INT2. This arrangement still provides for a thermal printer in which various types of a bar code may be printed by using a single thermal printer as in the foregoing embodiment, and the element bars may be set either in parallel and in perpendicular to the direction of paper feed.

In each of the foregoing embodiments of the invention, the cycles T1 and T2 are changed by the operation of the keyboard 23. It is possible, however, that they are automatically preset in the initialization processing, for example, by forming a discrimination section in the printing head 19 mounted on the holder HL and providing a sensor which detects changes at the discrimination section.

The thermal printer in each of the above embodiments is designed with particular emphasis on the technique of not producing any change in type of a bar code rotated 90 degrees, and the use of the technique is equally applicable to avoiding any changes of shape from occurring in characters and graphical simbles.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A thermal printer comprising:
   memory means for storing printing patterns;
   a printer unit on which a thermal printing head having one line of dot print elements is replaceably mounted, said printer unit driving said printing head to print a printing pattern stored in said memory means in a unit of one line;
   a paper feed unit for feeding paper in a direction perpendicular to a direction of a print element line of the printing head mounted on the printer unit;
   first timer means for setting a print cycle for the printing head mounted on said printer unit;
   second timer means for setting a feed cycle for feeding paper to said printing head at a selected speed; and
   control means for concurrently driving said printer unit in the print cycle and said paper feed unit in the feed cycle, said control means driving said printer unit to cause said printing head to print in the print cycle while the paper feed unit is driven to continuously feed paper to said printer unit at said selected speed determined by the feed cycle set by said second timer means;

wherein said control means includes adjusting means for adjusting at least one of said first and second timer means, to thereby adjust at least one of the print cycle and feed cycle, in such a manner that a length of the paper feed per printing line is equal to a print element pitch of said printing head, according to the print element pitch of said printing head.

2. A thermal printer according to claim 1, wherein said adjusting means includes changing means for changing at least one of the print cycle preset in said first timer means and the feed cycle preset in said second timer means, at a time of replacement of said printing head.

3. A thermal printer according to claim 2, wherein said changing means includes input means for inputting a new print cycle and a new feed cycle and preset means for presetting the new print cycle in said first timer means and the new feed cycle in said second timer means.

4. A thermal printer according to claim 1, wherein said paper feeding unit includes a feeding mechanism for feeding the paper, a stepping motor for driving said feeding mechanism, and a motor driver for causing said stepping motor to rotate by one step angle each time said second timer means detects passage of the feed cycle.

* * * * *